H. M. SMITT.
APPARATUS FOR MEASURING THE INCLINATION OF BORE HOLES AND MAKING A PHOTOGRAPHIC RECORD THEREOF.
APPLICATION FILED SEPT. 24, 1913.
1,124,068.
Patented Jan. 5, 1915.
2 SHEETS—SHEET 1.
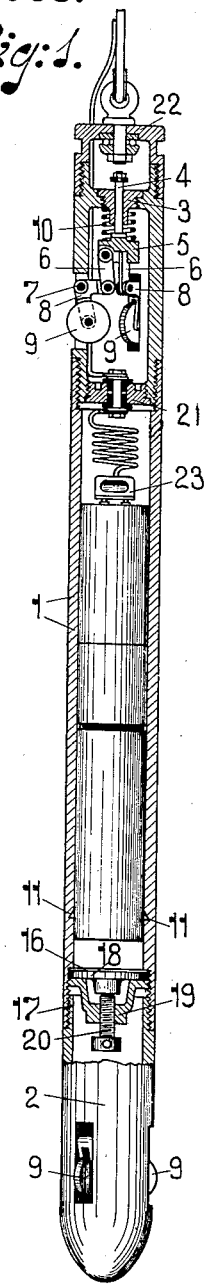
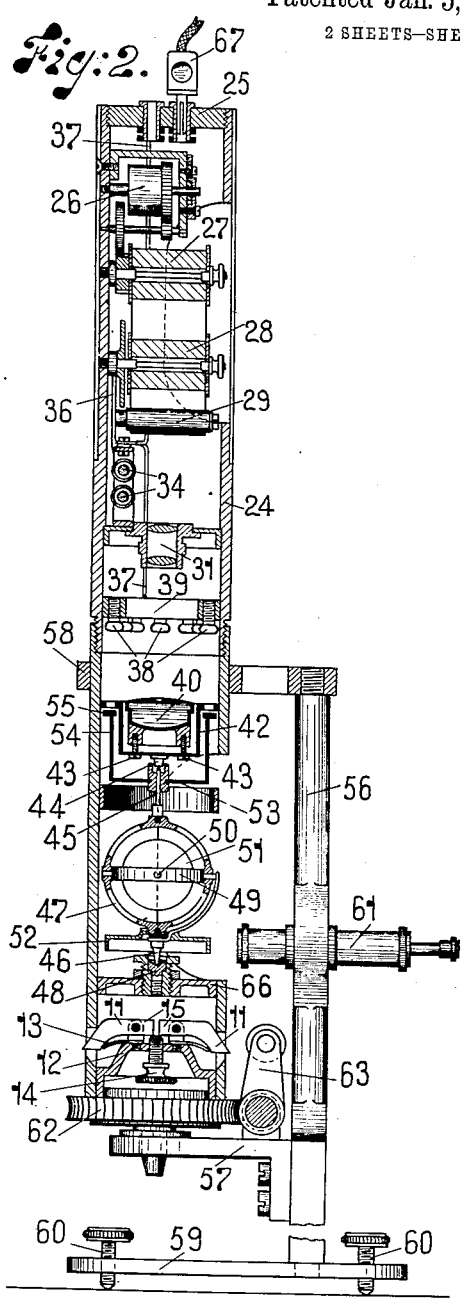
Witnesses
M. E. McDade
Inventor
Hermanus M. Smitt
By James L. Norris
Attorney H. M. SMITT.
APPARATUS FOR MEASURING THE INCLINATION OF BORE HOLES AND MAKING A
PHOTOGRAPHIC RECORD THEREOF.
APPLICATION FILED SEPT. 24, 1913.
1,124,068.
Patented Jan. 5, 1915.
2 SHEETS—SHEET 2.
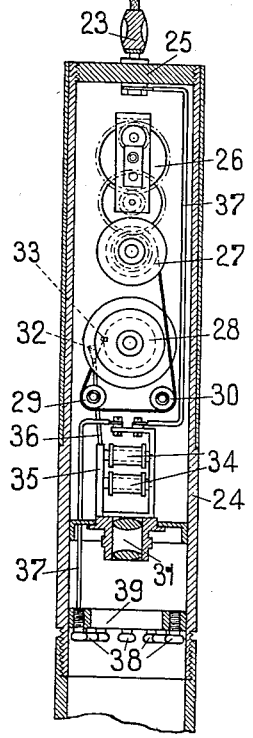
Fig: 3.
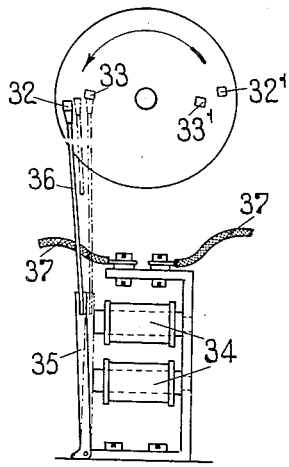
Fig: 4.
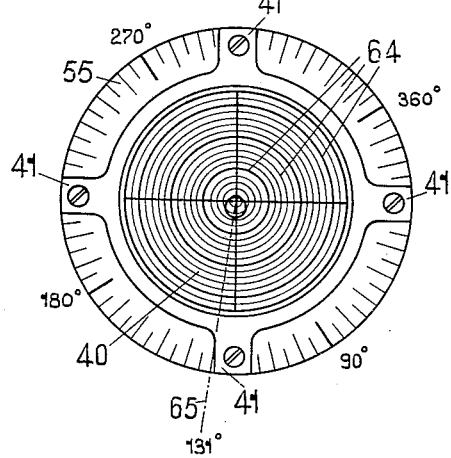
Fig: 5.
Witnesses
M. E. McHade
Inventor
Hermanus M. Smitt
By James L. Norris
Attorney

UNITED STATES PATENT OFFICE.

HERMANUS MATTHEUS SMITT, OF UTRECHT, NETHERLANDS.

APPARATUS FOR MEASURING THE INCLINATION OF BORE-HOLES AND MAKING A PHOTOGRAPHIC RECORD THEREOF.

1,124,068.    Specification of Letters Patent.    Patented Jan. 5, 1915.

Application filed September 24, 1913. Serial No. 791,598.

*To all whom it may concern:*

Be it known that I, HERMANUS MATTHEUS SMITT, a subject of the Queen of the Netherlands, residing at Utrecht, Kingdom of the Netherlands, have invented certain new and useful Improvements in Apparatus for Measuring the Inclination of Bore-Holes and Making a Photographic Record Thereof, of which the following is a specification.

This invention relates to a device for measuring the inclination of bore-holes, more particularly for ascertaining the position in space of bore-holes used for the making of freezing shafts, although the apparatus can be used also for other bore-holes.

In the construction of the apparatus according to this invention, the drawback of using magnets has been more particularly avoided. As is well known, magnets are very considerably influenced by the iron masses contained near the bore-holes as well as by the magnetism of the earth and iron-containing rocks. The use of magnets is avoided in the apparatus according to this invention and the gyroscopic action of a rotating mass is utilized instead.

The construction of the apparatus differs in many respects from that of well known apparatus for the same purpose (stratameters or clinographs), although certain well known constructional details are employed.

The apparatus consists of a tube of a somewhat smaller diameter than that of the bore-hole to be controlled. This tube is exactly centered by means of spring-controlled rollers and forms the casing of the apparatus proper which is introduced into the same and secured therein, care being taken to close the apparatus in a thoroughly water-tight manner.

The action of the apparatus is based on ascertaining the positions of the air bubble of a box-level, in combination with a scale of degrees, which scale in all circumstances retains the position once assumed. In case of the inclination of the apparatus, the scale may also be inclined, but it must not turn. This is effected by means of a ring on which the scale is mounted, the said ring being connected to an easily rotatable spindle arranged in the longitudinal direction of the apparatus. This spindle is provided with a ring within which is trunnioned a second ring carrying within it a small fly wheel which can rapidly rotate. The axis of the fly wheel is at right angles to that of the trunnions of its carrying ring, and these trunnions are at right angles to the axis of the spindle which carries the scale. It will be seen that this gyroscopic arrangement in itself well known avoids a rotation of the scale-carrying ring even when the apparatus itself is rotated. The above mentioned ring is arranged about a box level secured in the apparatus, so that the photograph of the level obtained in the manner in itself well known, shows at the same time the scale division. The position in space of the bore hole can be ascertained from the pictures obtained during the lowering of the apparatus to known depths, as will be subsequently explained.

The pictures of the box level with the scale divisions illuminated in the well known manner by means of electric lamps, are photographed on a film and afterward developed to a negative picture. Although the recording of the position of the air bubble by photographic methods on a film roller must be considered as being in itself well known, the apparatus according to this invention is constructed in such a manner as to insure considerable advantages even in this respect over the well known apparatus. The manipulation of the apparatus according to this invention is exceedingly simple, chiefly owing to the fact that the turning of a simple switch is sufficient for obtaining a picture, while during a subsequent operation of the same switch, another picture is obtained direct.

A construction of the apparatus according to this invention is illustrated by way of example in the accompanying drawings in which, Figure 1 is a vertical section through the apparatus. Fig. 2 a vertical section through the inner portion of the apparatus on an enlarged scale. Fig. 3 an elevation of the film arrangement. Fig. 4 an elevation of a device for regulating the unwinding of the film, and Fig. 5 shows one of the pictures obtained.

The apparatus consists of an outer casing 1, the bottom end of which can be screwed on, and an inner part which contains the more important parts of the apparatus. The diameter of the outer casing of the apparatus is somewhat smaller than the inside width of the tube contained in the bore-hole. For the purpose of centering the apparatus, centering devices are provided at the upper and lower end. These centering devices are arranged as follows: Into a plug 3 is inserted a bolt 4 which fits exactly but is easily adjustable. At the end of the bolt is mounted a block 5 to which three or more links 6 are pivoted in such manner that they can swing radially outward. The ends of the said links are pivoted to bell crank levers 8 rotatable about pins 7 and carrying rotatable rollers 9. The spring 10 tends to drive the bolt 4 downward and therefore move the rollers outward, so that the latter engage with the inner wall of the bore-hole tube. It will be seen that this arrangement always insures an exact centering of the apparatus, as each roller 9 must be at the same distance from the axis of the apparatus.

The inner portion of the apparatus containing the more important mechanisms, is introduced into the outer casing and fits it exactly. The securing of this portion in the casing is effected by means of spring-controlled pawls 11. They are arranged at the bottom of the inner cylindrical portion of the apparatus and constructed as follows:— The locking pawls 11 are rotatably mounted on a bottom member 12 and forced upward by springs 13. During the introduction of the inner portion of the apparatus, the pawls are pressed inward and they engage with recesses or an annular recess in the inner wall of the casing 2, as soon as the inner portion has been pushed sufficiently far inward. For the purpose of unlocking these pawls, in the center of the member 12 is arranged a screw 14 which can be screwed against the ends 15, whereby the pawls 11 are caused to release themselves from the recess and disengage the pushed-in inner portion of the apparatus.

For the purpose of closing in a tight manner the sleeve or casing 1, disks 16 and 18, the latter of which is made of packing material, are screwed by means of the nut 19, under the inner portion of the apparatus into the widened portion 17 provided with an inner screw-thread. By turning the screw 20 arranged in the nut 19, the disk 18 is pressed firmly, so that a good closing is obtained. The greater the pressure of water the better will be the closing.

Above the inner portion of the apparatus the casing is closed in an air-tight manner by a fixed plate 21, so that the inner portion is closed in a thoroughly reliable manner against moisture. As will be subsequently explained, two electric circuits are required for working the apparatus. The current is supplied by means of two insulated wires carried along the suspension cable and introduced through the cover 22 of the casing and through the plate 21 to a plug contact 23 which is inserted into the inner portion of the apparatus before the introduction of the latter. The two wires are connected to one and the same pole of a source of electricity. One of these circuits is used for photographing, while the other one is used for driving a small electric motor which has a fly wheel mounted upon its spindle. For both circuits the earth i. e. the frame of the apparatus is used as the return.

The inner portion of the apparatus which, as already stated, contains the more important mechanism, consists of a cylindrical tube 24 closed at the upper edge by a cover 25 receiving the plug contacts 23. Under the said cover is arranged a driving gear 26 tending to rotate, in the direction of the arrow (Fig. 4), the roller 27 on which is wound the film. The film wound on the roller 28 is guided over two smaller rollers 29, 30 to the roller 27, in such a manner that the portion of the film between the rollers 29 and 30 is at right angles to the axis of the lens 31 placed below. In order that after each illumination that is to say, after each photographing of a picture, the film should be rotated farther to a suitable extent, the following brake device is provided for the roller 28.

On the lateral disk of the roller 28 is arranged one, or according to the diameter of the roller more pairs of stops 32 and 33, or 32' and 33', in such a manner that the stops 32 or 32' are not arranged exactly on the same radius drawn from the center of the lateral disk, as the stops 33 or 33'. Below the roller 28 is arranged an electromagnet 34, the spring-controlled armature 35 of which is provided with a projecting arm 36. When the armature is not attracted, the end of the arm 36 rests against the stop 32 (as shown in full lines in Fig. 4), so that the film cannot be wound up. If the electromagnet 34 is energized by a current coming from a source of electricity not shown in the drawing and carried along the suspension cable to the plug contact and passing through the wire 37 shown in Fig. 2 and carried farther from the plug contact through the electromagnet and through the electric lamps 38 arranged below the lens 31, to earth, the armature 35 will be attracted, and the end of the arm will engage under the stop 33, so that the roller 28 will be braked. The film will therefore be stretched by the driving gear 26 and the lamps lighted. The lens 31 then projects on the film a picture of the devices situated under the lamps which are arranged in a ring 39 on the inner wall of the tube 24. When the current is cut off, for which purpose a switch is provided in the conductor on the surface of the earth, the lamps are extinguished, and the armature springs back, the end of the arm striking the side of the stop 32 situated a little lower as shown dotted in the intermediate position in Fig. 4. The roller 28 is therefore not braked during that movement, and consequently continues to rotate until the next stop, for instance 32', strikes the end of the arm. This turns the film to a certain extent, so that the apparatus is ready for taking another photograph. It is therefore sufficient simply to switch on the current for a short time in order to take a photograph.

Below the electric lamps 38 is arranged a box level 40, the axis of which, like the axis of the lens, is arranged in the central axis of the tube 24. The box level is secured in the tube 24 by means of the arms 41 (Fig. 3) the said arms carrying a sleeve 42 in which the box level 40 is adjustably mounted by means of set screws 43. At the bottom of the sleeve 42 is arranged a pin 44 on which rests the point of the spindle 45. This spindle 45, and a pivot 46 supported in the fixed disk 66, carry a ring 47 in such a manner that the axis of the spindle and of the pivot working in the fixed bearing 48 are situated in the axis of the apparatus, while the center line of the ring is also situated in the said axis.

In the ring 47 is rotatably mounted a second ring 49, in such manner that the line connecting the two short pins about which the ring 49 rotates, is normal to the axis of the spindle 45 and of the pivot 46. The ring 49 can therefore rotate in the ring 47. In the ring 49 is arranged a spindle 50 which is at a right angle to the line connecting the short pins of the ring 49. This spindle carries the armature and the collector of a small electric motor, as well as a fly wheel 51. Thus the mounting of the spindle, motor and fly wheel is after the manner of a gyroscope. The magnetic poles of the motor are arranged in the ring 49, while the current is supplied by a wire coming from a separate plug contact 67, to the spindle 45, the bearing 44 of which is insulated from the sleeve 42. From the spindle 45 the current is carried in a suitable manner to the magnet pole windings, to the brushes of the motor and, through the armature, to earth. To that end, insulating material is inserted at suitable points. It will be seen that when the motor rotates, the fly wheel will remain in its plane of rotation, and therefore the spindle 50 will always retain exactly the same direction, even when the apparatus is in an oblique position. The consequence of this is that the ring 47 will always remain in exactly the same plane, even though the apparatus itself be turned. When the apparatus is in an oblique position, the ring 47 will however also assume an oblique position with the apparatus.

On the pivot 46, or on the ring 47, is mounted a disk 52, the outer circumference of which is provided with divisions from 0-360°. On the spindle 45 is also mounted a disk 53 which by means of arms 54, supports a ring 55. This ring 55 is provided with divisions from 0-360° in the same way as the disk 51, the said divisions seen from the top, appearing around the box level. The graduations are arranged in such manner that when the apparatus is in the vertical position, the graduation lines of the same number are situated vertically above each other. By the action of the fly wheel 51, the radial graduation lines of the ring 55 will always continually point in the same direction of compass, even if the apparatus itself is turned or placed obliquely.

For the purpose of ascertaining the exact position of the graduations of the disk 52, and therefore also of the graduations of the ring 55, a holder (Fig. 2) of the following construction is employed:—The arm 56 of the holder to be adjusted, is provided with a bracket 57 on which can be placed the tube 24 containing the inner portion of the apparatus, after it has been pushed through a ring 58. By means of set screws 60 arranged in the foot of the holder, the axis of the apparatus can be placed in the vertical position. With the assistance of a viewer 61 provided with cross-threads and arranged on the arm 56, the position of the scale can be observed on the disk 52. The scale of the ring 55 is then in the same position as that observed. For adjusting or turning the apparatus, a toothed plate 62 on which the apparatus rests on the bracket 57 can be rotated by means of a worm provided with a crank handle 63.

The method of operation is as follows:— First of all, the inner portion of the apparatus inclosed in the tube 24, is vertically adjusted in the holder. One pole of a source of electricity is then connected to the apparatus in such manner as to supply the current to the motor. The second pole of the source of electricity is connected to earth. The motor then starts, the position of the scale on the disk 52 being observed. This portion of the apparatus is then removed from the holder and introduced into the tube 1 of the apparatus after having placed the plug contact 23 into the portion of the apparatus made to receive it. The apparatus is then closed in a water-tight manner by means of the described parts 16, 18, 19 and 20, whereupon the bottom end 2 of the apparatus is screwed on (Fig. 1). The apparatus is then placed into the freezing tube or bore-hole without breaking the circuit leading to the motor, but the circuit leading to the switch for the lamps, is however broken during the lowering. After the apparatus has been lowered to about 10 meters, 20 meters, 30 meters, etc., the lighting circuit is completed for a short time, the box level and the scale divisions of the ring 55 being thus illuminated. The lens 31 projects then an image of the box level and of the scale graduations on to the film 63 which, after development, shows pictures such as that illustrated in Fig. 5. The scale divisions on the ring 55 always remaining, as already stated, in the same direction, while the air bubble deviates from the central position when the apparatus is in an oblique position, the position of the freezing tube or the bore-hole can be exactly ascertained by means of the photographs. On the box level are drawn concentric circles 64 which are at such a distance from each other that when the air bubble is situated exactly under the second small circle calculating from the center, the inclination of the apparatus is a given one, for instance 0.2% from the vertical position.

If a line 65 is drawn through the center of the box level and through the center of the air bubble, the said line will pass through a given portion of the scale division, namely for instance as shown in Fig. 5 through the line marked 131°. According to Fig. 5 (in which the air bubble is on the inner circle 64) the inclination of the apparatus, as well as of the freezing tube is 0.2% in the direction of the graduation 131°, that is to say, the bottom portion of the apparatus has deviated in this direction. By drawing the consecutive inclinations of the apparatus, the exact position of the freezing tube can be easily ascertained. For the purposes of control, after the apparatus has been withdrawn from the freezing tube, the inner portion of the apparatus inclosed in the tube 24, can be again placed in the holder, in order to ascertain whether the disk 52 or the ring 55 have turned.

I claim as my invention:—

1. An apparatus for measuring the inclination of bore-holes in which the inclination of the hole is ascertained on an advancing photographic film by means of photographs produced in the apparatus itself, of a box level, characterized by the device for measuring the inclination of the bore hole being constituted by a centering casing into which the apparatus proper (the inner portion) is inserted in a water-tight manner, the apparatus proper containing in the following sequence starting from the top a driving device for the film, a locking device for the film, a photographic lens, illuminating lamps, the box level and a device for holding fast a graduated ring arranged around the box level in such a manner that the ring inclines with the apparatus, but always retains the position once assumed, independently of any rotation of the apparatus or of the influence of the iron parts situated in proximity to the apparatus, or of magnetic influences.

2. In apparatus for measuring the inclination of bore holes, the combination of a suitable casing adapted to be lowered into the bore hole, a box level therein having means for illuminating it, means coöperative with the level for preventing rotation thereof irrespective of rotation of the casing, and means within the casing for photographing the level.

3. In apparatus for measuring the inclination of bore holes, the combination of a suitable casing adapted to be lowered into the bore hole, a box level therein having means for illuminating it, means coöperative with the level for preventing rotation thereof irrespective of rotation of the casing, a graduated dial coöperative with the level, and means for photographing the level and dial.

4. In apparatus for measuring the inclination of bore holes, the combination of a suitable casing adapted to be lowered into the bore hole, a box level therein having means for illuminating it, a gyroscope operative to prevent rotation of the level irrespective of rotation of the casing, and means for photographing the level.

5. In apparatus for measuring the inclination of bore holes, the combination of a suitable casing, a box level therein having means for illuminating it, a graduated dial coöperative with the level, a gyroscope operative to prevent rotation of the level and dial, and means for photographing the level and dial.

6. In apparatus for measuring the inclination of bore holes, the combination of a suitable casing adapted to be lowered into the bore hole, a box level having means for illuminating it, means for producing photographs of the level including a film and means for advancing it, and film-controlling means including an escapement operative to cause advancement of the film one step at each operation thereof.

7. In a machine for measuring the inclination of bore holes, the combination of a suitable casing adapted to be lowered into the bore hole, a box level having means for illuminating it, means for producing photographs of the level including a film, means tending to advance the film to make successive exposures thereon, a disk having stops thereon, and electrically operated means coöperative with said stops to cause the film to advance one step for each actuation thereof.

8. In apparatus for measuring the inclination of bore holes, the combination of a suitable casing adapted to be lowered into the bore hole, a box level having means for illuminating it, means for producing photographs of the level including a film, means tending to advance the film to make successive exposures thereon, illuminating means for the level, and means controlling the illuminating means and the film-advancing means.

9. In apparatus for measuring the inclination of bore holes, the combination of an outer casing adapted to be lowered into the bore hole and provided with means for centering the same therein, of an inner casing containing mechanism for measuring the inclination of the bore hole, said inner casing being adapted for insertion into the outer casing and having pawls pivoted thereon, springs tending to force said pawls outwardly into engagement with the outer casing, and means operative on the pawls to retract them from engagement with the outer casing.

10. In an apparatus of the class described, the combination of an outer casing adapted to be lowered into a bore hole and having means for centering the same therein, an inner casing containing mechanism for measuring the inclination of the bore hole, and means for producing a water-tight seal between the outer and inner casings comprising a packing disk, and a screw acting thereon to compress the same and thereby close the respective end of the outer casing.

11. In a machine of the class described, the combination of a suitable casing adapted to be lowered into the bore hole, a box level having means for illuminating it, and means for producing photographs of the level including a film, winding and unwinding rollers coöperative with the respective ends of the film, means coöperative with the film-winding roller and tending to advance the film, a controlling disk connected to the film-unwinding roller and provided with a pair of stops arranged at different levels thereon, a controlling arm normally engaging the stop at the lower level, and an electro-magnet coöperative with said arm to engage it from the stop at the lower level and to move it into the path of the stop at the higher level, said controlling arm being adapted to pass between the stops and thus permit rotation of the disk to advance the film one step for each photograph.

12. In a machine of the class described, the combination of a suitable casing adapted to be lowered into the bore hole, a level in the casing for indicating the inclination of the bore hole, and means for photographing the level comprising a circular series of electric lamps arranged concentrically before the level, and means for conducting current to said lamps to illuminate the same at intervals to produce successive exposures.

13. In a device for measuring the inclination of bore holes, the combination of an outer casing adapted to be lowered into the bore hole and having means for centering the same therein, an inner casing within the outer casing, a box level in the inner casing having means for maintaining the same in a constant direction irrespective of rotation of the casing on its axis, a dial coöperative with the level, means for photographing the level and dial, and a second dial corresponding to the dial first mentioned and maintained in constant relation therewith, the second dial being visible from a side of the inner casing when the latter is removed from the outer casing.

In testimony whereof I have hereunto set my hand in presence of two subscribing witnesses.

HERMANUS MATTHEUS SMITT.

Witnesses:
 THOMAS H. VERHAVE,
 P. HILDERING.